(12) United States Patent
Tsuji et al.

(10) Patent No.: US 9,083,117 B2
(45) Date of Patent: Jul. 14, 2015

(54) CARD CONNECTOR

(71) Applicant: Tyco Electronics Japan G.K., Kanagawa-ken (JP)

(72) Inventors: Junya Tsuji, Tokyo (JP); Katsuhiko Kobayashi, Tokyo (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 13/967,889

(22) Filed: Aug. 15, 2013

(65) Prior Publication Data

US 2014/0057469 A1     Feb. 27, 2014

(30) Foreign Application Priority Data

Aug. 24, 2012    (JP) ................................ 2012-185651

(51) Int. Cl.
    *H01R 13/62*     (2006.01)
    *H01R 13/635*     (2006.01)
    *G06K 7/00*     (2006.01)

(52) U.S. Cl.
    CPC ................ *H01R 13/635* (2013.01); *G06K 7/00* (2013.01)

(58) Field of Classification Search
    CPC ..... G06K 7/00; G06K 13/08; G06K 13/0806; H01R 13/635; H01R 13/633; H05K 5/0295
    USPC .................. 439/159–160, 630, 946
    See application file for complete search history.

(56) References Cited

U.S. PATENT DOCUMENTS

| 6,966,786 | B1 | 11/2005 | Motojima et al. |
| 6,994,573 | B2 | 2/2006 | Tanaka et al. |
| 7,220,138 | B2 | 5/2007 | Miyamoto |
| 7,341,466 | B1* | 3/2008 | Kondo .......................... 439/159 |
| 7,367,824 | B1* | 5/2008 | Yen et al. ..................... 439/152 |
| 7,377,797 | B2* | 5/2008 | Tsai .............................. 439/159 |
| 7,381,069 | B2 | 6/2008 | Saito et al. |

(Continued)

FOREIGN PATENT DOCUMENTS

| CN | 2773941 Y | 4/2006 |
| CN | 2882021 Y | 3/2007 |

(Continued)

OTHER PUBLICATIONS

Japanese Office Action, 3 pages.

(Continued)

*Primary Examiner* — Edwin A. Leon
(74) *Attorney, Agent, or Firm* — Barley Snyder

(57) ABSTRACT

A card connector having a housing with a card insertion end, an opposing distal end, and a base. The card connector has a shell positioned on the housing. A card insertion space and a card ejection mechanism receiving space are both positioned between the housing and the shell. The card connector has a card ejection mechanism disposed in the card ejection mechanism receiving space. The card ejection mechanism includes a sliding member, a spring biasing the sliding member in a card-ejecting direction, a lock for locking the sliding member at a locking position; and a sliding member guide. The sliding member guide includes a first guiding member disposed on an interior surface of the base and engageable with a card insertion end of the sliding member; and a second guiding member disposed on an interior surface of the shell and engageable with a distal end of the sliding member.

16 Claims, 16 Drawing Sheets

(56) References Cited

U.S. PATENT DOCUMENTS

| | | |
|---|---|---|
| 7,473,115 B2 * | 1/2009 | Yu et al. .................. 439/188 |
| 7,658,638 B2 | 2/2010 | Motojima |
| 7,708,575 B2 | 5/2010 | Motojima |
| 7,819,679 B2 | 10/2010 | Tsujimoto |
| 2011/0104920 A1 | 5/2011 | Matsunaga |
| 2011/0306224 A1 | 12/2011 | Guo et al. |

FOREIGN PATENT DOCUMENTS

| | | |
|---|---|---|
| CN | 201440519 U | 4/2010 |
| CN | 101989712 A | 3/2011 |
| JP | 2001-357936 | 12/2001 |
| JP | 2006-252950 | 9/2006 |
| JP | 2008270109 A | 11/2008 |
| JP | 2011-034832 | 2/2011 |
| JP | 201228337 A5 | 9/2012 |
| KR | 1020090004541 A | 1/2009 |

OTHER PUBLICATIONS

Korean Office Action, dated May 7, 2014, 4 pages.
Korean Office Action, dated May 7, 2014, 3 pages.
Chinese Office Action, dated Jun. 26, 2014, 6 pages.
Chinese Office Action, dated Dec. 22, 2012, 6 pages.

* cited by examiner

CARD CONNECTOR

CROSS-REFERENCE TO RELATED APPLICATION

This application claims the benefit of the filing date under 35 U.S.C. §119(a)-(d) of Japanese Patent Application No. JP 2012-185651, filed Aug. 24, 2012.

FIELD OF THE INVENTION

The present invention relates to a card connector provided with a card ejection mechanism for ejecting an inserted card.

BACKGROUND

Conventionally, card connectors generally have a card ejection mechanism for ejecting an inserted card, such as a memory card or a Subscriber Identity Module ("SIM") card.

A conventional card connector 101 disclosed in JP 2011-34832A is shown in FIG. 22, which has a housing 110 made of synthetic resin with the top face and the card insertion face opened; and a metal shell 120 attached to the upper side of the housing 110 to form an insertion space for a card (not shown). Moreover, a card insertion slot 111 is arranged in combination of the housing 110 and the shell 120.

Multiple electrical contacts 112 for making contact with the card are provided at a base 110a of the housing 110, and in addition, a card ejection mechanism receiving space 113 is formed at one end portion of the housing 110 in the width direction (the horizontal direction in FIG. 22). The card ejection mechanism receiving space 113 is arranged between a side wall 110c of the housing 110 and a guide wall 110b protruding upward from the base 110a of the housing 110. Moreover, a card ejection mechanism 130 for ejecting the inserted card is disposed in the card ejection mechanism receiving space 113.

The card ejection mechanism 130 includes: a sliding member 131; an ejection spring 132; a cam groove 133; and a cam rod 134, in which the cam groove 133 and the cam rod 134 constitute a locking mechanism of the sliding member 131 against the biasing force of the ejection spring 132.

The sliding member 131 is made of resin and slides together with the card in the card ejection mechanism receiving space 113 in the card-inserting direction and in the card-ejecting direction. When the sliding member 131 is displaced, the lower side portion of one of the side walls of the sliding member 131 slides along the guide wall 110b. In addition, a metal sheet 114 is provided in the card ejection mechanism receiving space 113, so that the sliding member 131 slides on the metal sheet 114.

The ejection spring 132 is provided between the back wall of the housing 110 and the back end of the sliding member 131, and biases the sliding member 131 in the card-ejecting direction.

Furthermore, the cam groove 133 is arranged in the top face of the sliding member 131. The cam rod 134 has one end mounted to the back wall of the housing 110 in a rotatable manner, and has the other end engaged with the cam groove 133. This permits the sliding member 131 to be locked at a locking position in the card-inserting direction and the card-ejecting direction against the biasing force of the ejection spring 132.

However, the conventional card connector 101 shown in FIG. 22 presents a problem if the card connector 101 is mounted on, for example, a flexible printed circuit (FPC). To operate correctly, when the sliding member 131 is displaced, the lower side portion of one of the side walls of the sliding member 131 slides along the guide wall 110b protruding from the base 110a of the housing 110. This guides the sliding of the sliding member 131 to ensure smooth sliding of the sliding member 131. When mounted on an FPC, the base 110a of the housing 110 may be warped due to an elastic force exerted by the electrical contacts 112 in the insertion of the card. If the base 110a of the housing 110 is warped, the guide wall 110b provided on the base 110a is displaced downward and the guide wall 110b may be disengaged from the side wall of the sliding member 131. This makes it difficult for the guide wall 110b to guide the sliding of the sliding member 131, and thus leading to a disadvantage that the sliding member 131 is not capable of sliding in a smooth manner.

SUMMARY

It is therefore an object of the present invention, among others, to provide a card connector capable of guiding a sliding member of a card ejection mechanism.

A card connector having a housing with a card insertion end, an opposing distal end, and a base. The card connector has a shell positioned on the housing. A card insertion space and a card ejection mechanism receiving space are both positioned between the housing and the shell. The card connector has a card ejection mechanism disposed in the card ejection mechanism receiving space. The card ejection mechanism includes a sliding member, a spring biasing the sliding member in a card-ejecting direction, a lock for locking the sliding member at a locking position; and a sliding member guide. The sliding member guide includes a first guiding member disposed on an interior surface of the base and engageable with a card insertion end of the sliding member; and a second guiding member disposed on an interior surface of the shell and engageable with a distal end of the sliding member.

BRIEF DESCRIPTION OF THE DRAWINGS

The invention will now be described by way of example with reference to the accompanying figures, of which:

FIG. 20A and FIG. 20B are cross-sectional views of a warped base, in which FIG. 20A is a cross-sectional view of a first guiding member, and FIG. 20B is a cross-sectional view of an second guiding member;

FIG. 21A and FIG. 21B are cross-sectional views of a warped shell, in which FIG. 21A is a cross-sectional view of the first guiding member, and FIG. 21B is a cross-sectional view of the second guiding member.

DETAILED DESCRIPTION OF THE EMBODIMENTS

Embodiments of the present invention will be described below with reference to the accompanying drawings.

Figure 1:
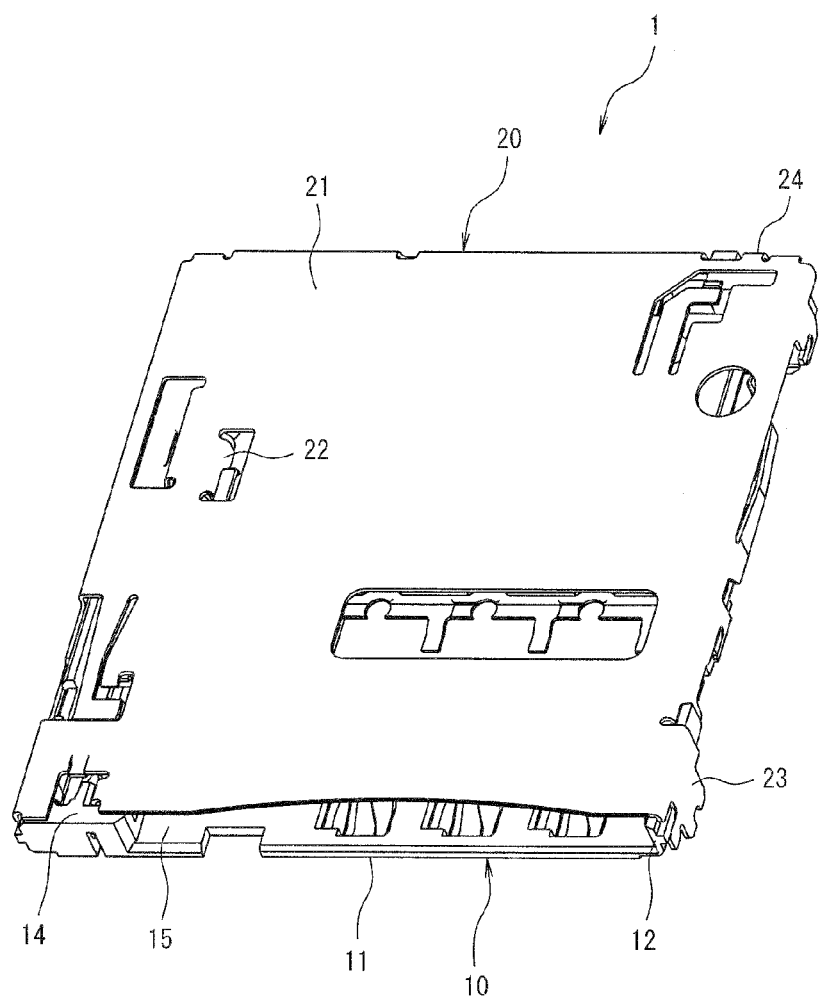
FIG. 1 is a perspective view illustrating a card connector.

A card connector 1 illustrated in FIG. 1 is mounted on a circuit board, not illustrated, such that a card C can be inserted and ejected from the card connector 1. Examples of the card C include memory cards and SIM cards, although one of ordinary skill in the art would appreciate that other types of cards may also be used. The card C being inserted into the card connector 1 is electrically connected to the circuit board.

Figure 2:
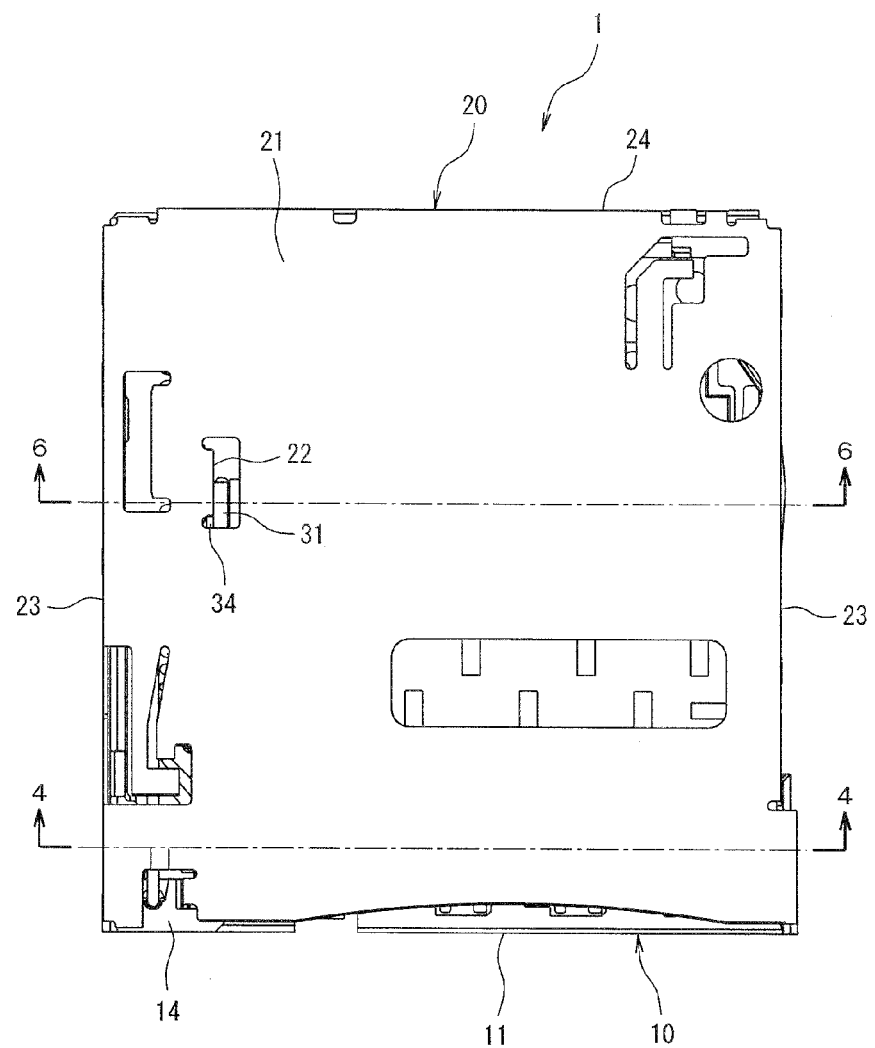
FIG. 2 is a plan view illustrating the card connector in FIG. 1 where a card is ejected from the connector.
Figure 3:
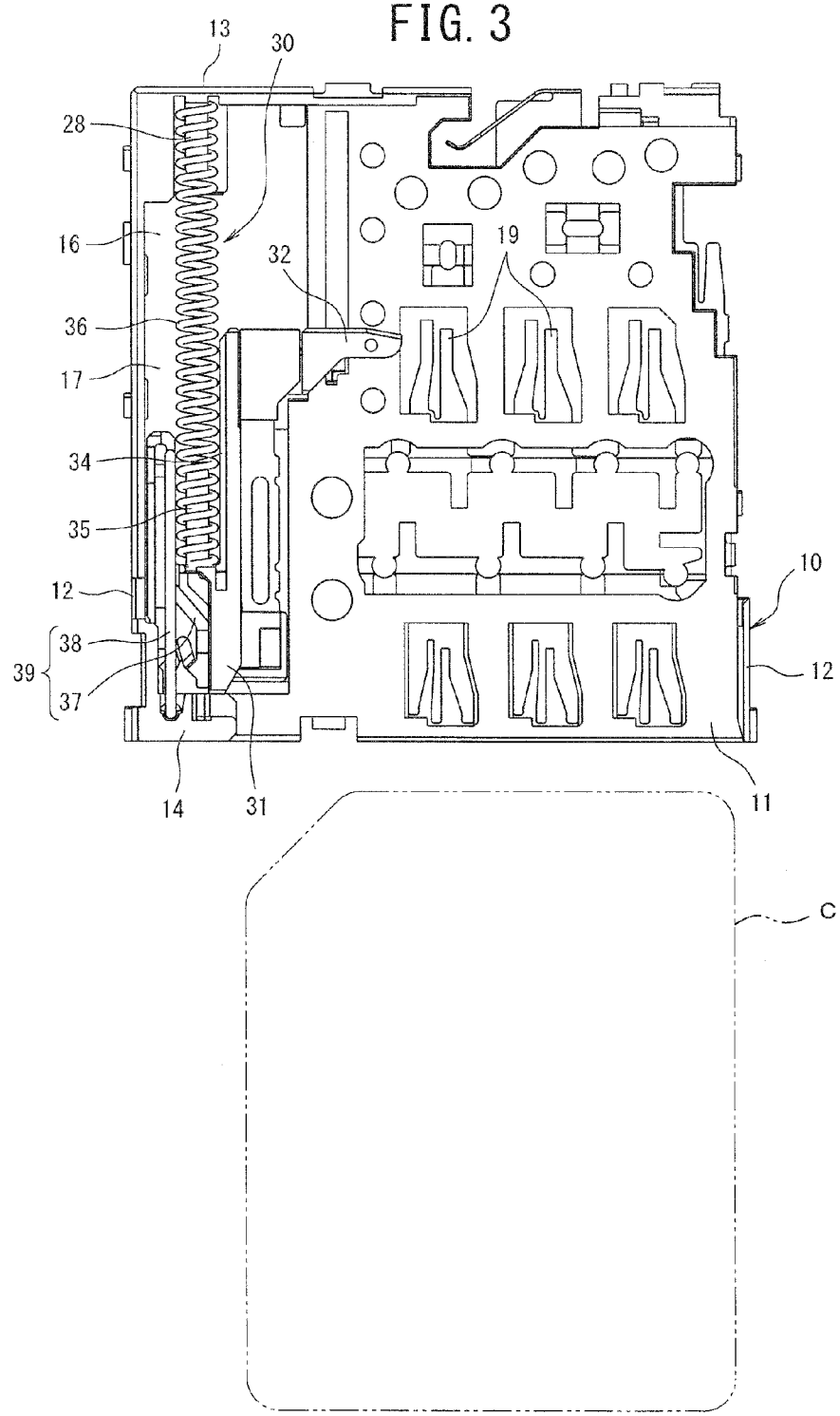
FIG. 3 is a plan view illustrating the card connector in FIG. 2, where a shell is removed.

The card connector 1 includes, as illustrated in FIG. 1 to FIG. 3, a housing 10, contacts 19, a shell 20, and a card ejection mechanism 30.

As illustrated in FIGS. 1-3, the housing 10 has a planar base 11 formed to have a substantially rectangular shape that extends in the width direction (the horizontal direction in FIG. 3) and in a card insertion and a card ejection direction. In addition, the housing 10 is provided with: a first side wall 12 and an opposing second side wall 12, each projecting from opposite edges of the base 11 and extending from a card insertion end to a distal end of the housing 10; a distal wall 13 projecting from the distal end of the base 11 and extending between the distal ends of the first and second side walls 12; and a card insertion end wall 14 projecting from the card insertion end of the base 11. The housing 10 has an inner surface face on a side of the base 11 and a card insertion end that are opened. As illustrated in FIG. 3, the card C is inserted from the card insertion end of the housing 10. A card ejection mechanism receiving space 16, which is arranged between the distal wall 13 and the card insertion end wall 14 of the housing 10, is formed in the proximity of the left end of the base 11 of the housing 10 in the width direction. The housing 10 can be formed by molding an insulating synthetic resin or other suitable insulating materials.

In one embodiment, a plurality of contacts 19 are arranged in at least one row disposed perpendicular to the side walls 12 of the base 11. In another embodiment a plurality of contacts 19 are arranged in at least two rows disposed perpendicular to the side walls 12 of the base 11, as illustrated in FIG. 3. Each contact 19 is provided for making contact with a conductive pad (not illustrated) positioned on an external surface of the card C, and at the same time, is connected with the circuit board. Each contact 19 is made by stamping and forming a conductive metal sheet.

As illustrated in FIGS. 1 and 2, the shell 20 is attached to the housing 10 to cover at least a part of the housing 10, and to form a card insertion space 15. The shell 20 has a planar member 21 covering the inner surface of the base 11; a first side wall 23 and a second side wall 23 covering the first side wall 12 and the second side wall 12 of the housing 10, respectively; and a distal wall 24 covering the distal wall 13 of the housing 10. The planar member 21 extends between the first and second side walls 23 and between the distal wall 13 and the card insertion end wall 14 of the housing 10. Each side wall 23 projects from opposite edges of the planar member 21 from a card insertion end to a distal end of the shell 20. Moreover, the distal wall 24 projects from the distal end of the planar member 21, and extends between the distal ends of the first and second side walls 23. The shell 20 is made by stamping and forming a conductive metal sheet.

Figure 4:
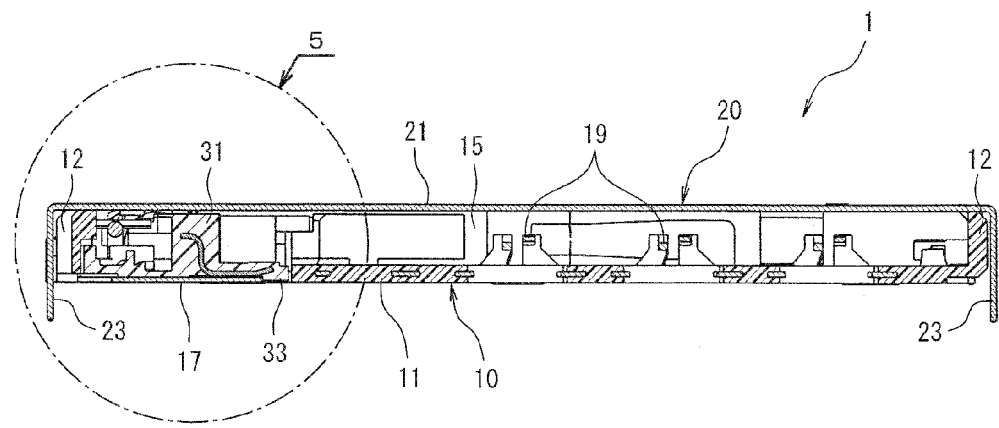
FIG. 4 is a cross-sectional view taken along a line 4-4 in FIG. 2.
Figure 5:
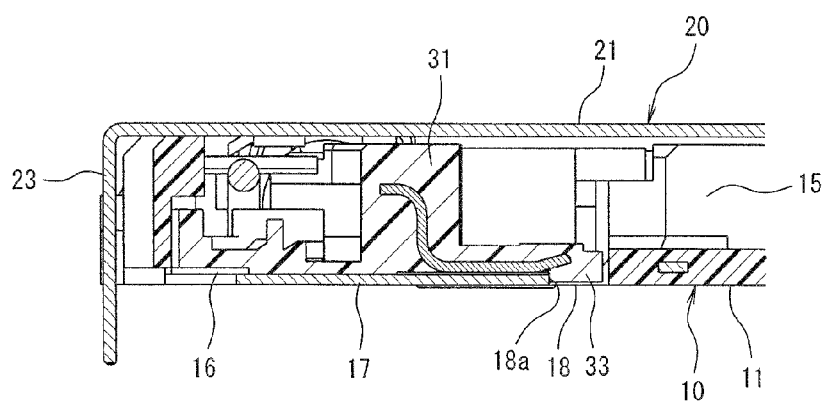
FIG. 5 is an enlarged view of area 5 in FIG. 4.
Figure 6:
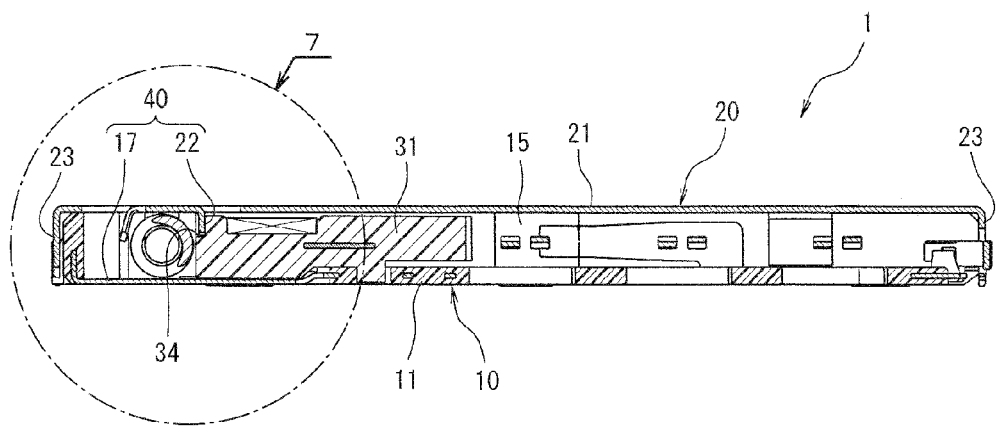
FIG. 6 is a cross-sectional view taken along a line 6-6 in FIG. 2.
Figure 7:
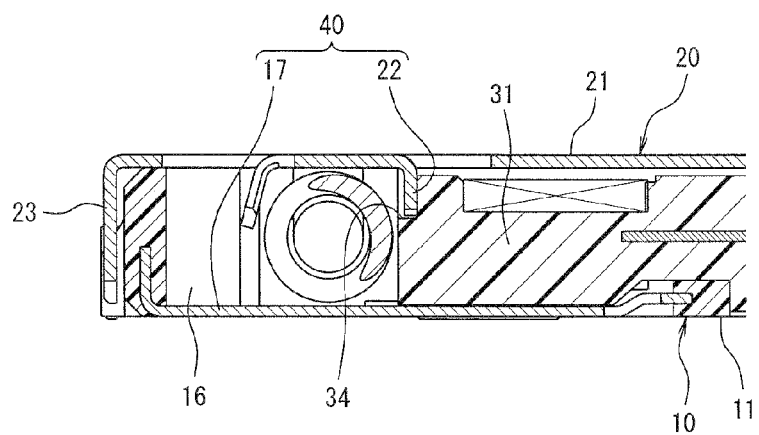
FIG. 7 is an enlarged view of area 7 in FIG. 6.
Figure 8:
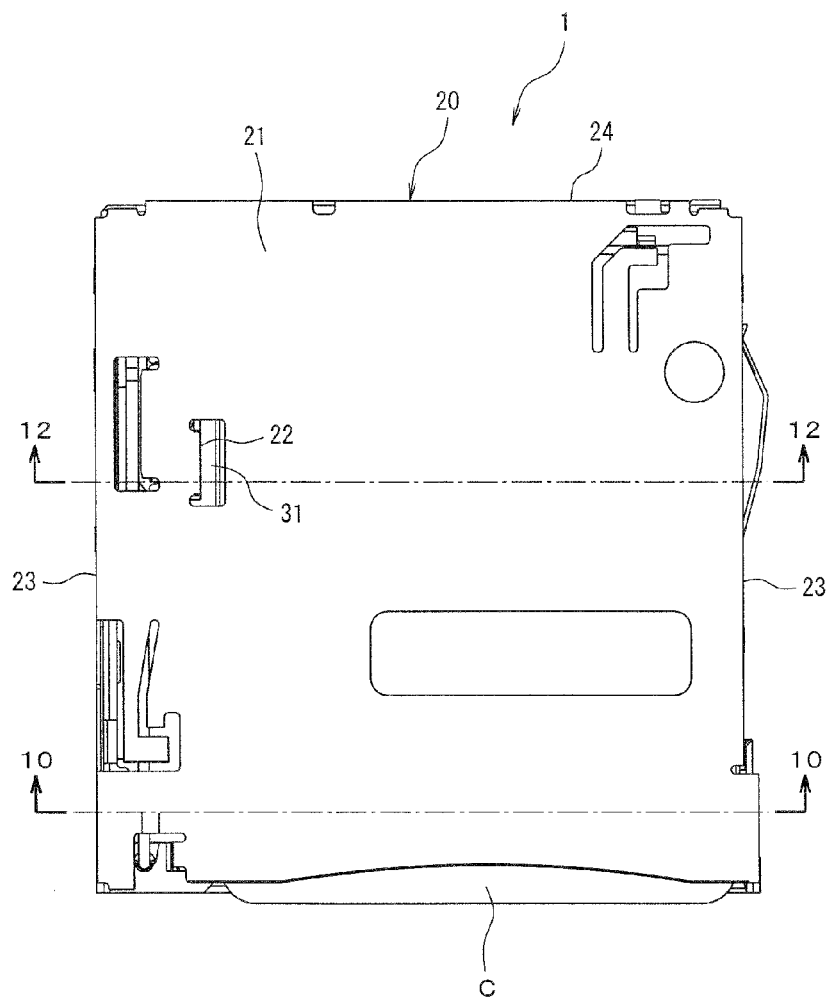
FIG. 8 is a plan view of the card connector in FIG. 1 where the card is fully inserted into the card connector.
Figure 9:
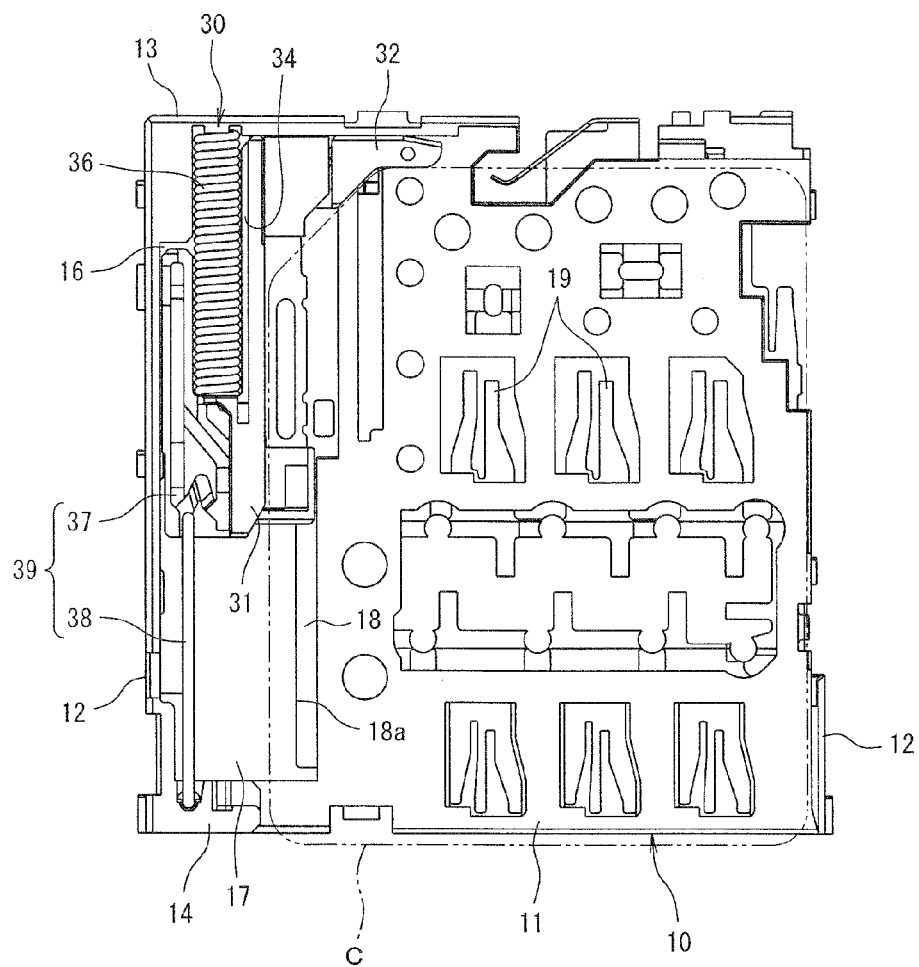
FIG. 9 is a plan view of the card connector in FIG. 8, where the shell is removed.
Figure 10:
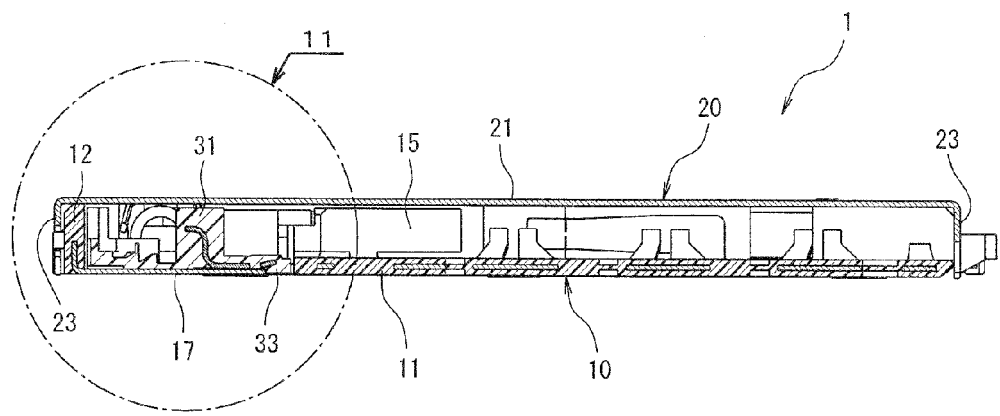
FIG. 10 is a cross-sectional view taken along a line 10-10 in FIG. 8.
Figure 11:
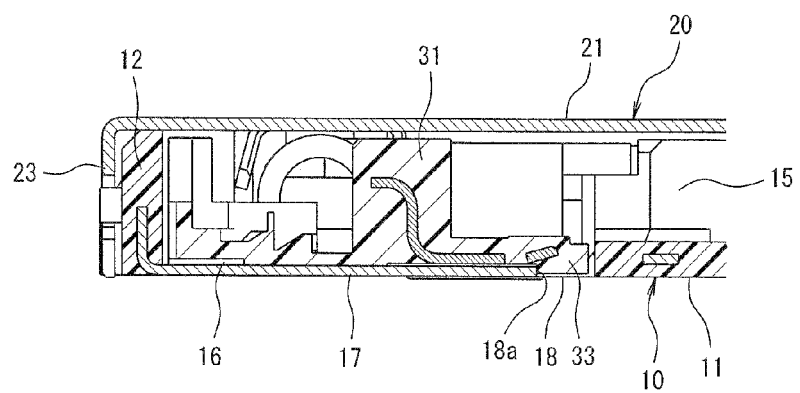
FIG. 11 is an enlarged view of area 11 in FIG. 10.
Figure 12:
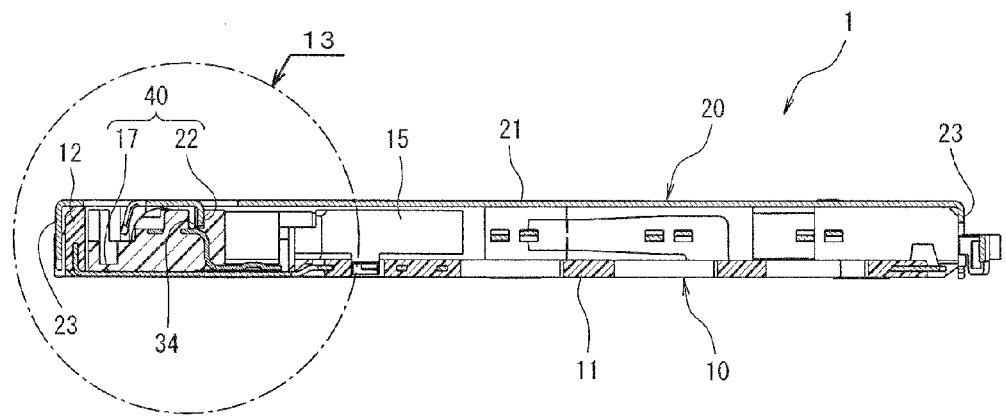
FIG. 12 is a cross-sectional view taken along a line 12-12 in FIG. 8.
Figure 13:
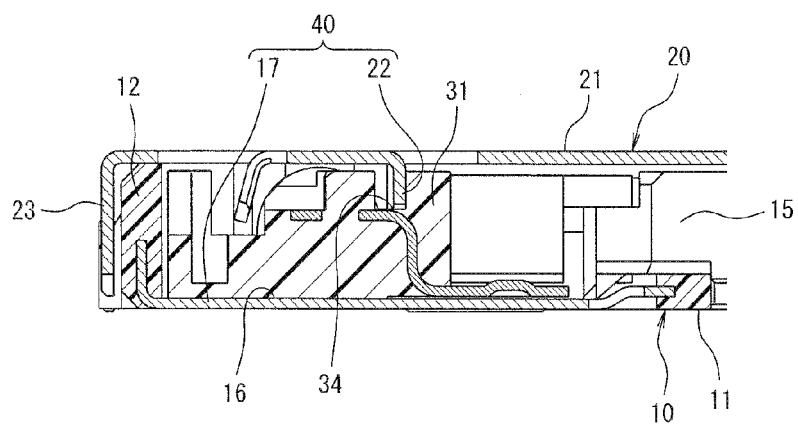
FIG. 13 is an enlarged view of area 13 in FIG. 12.
Figure 14:
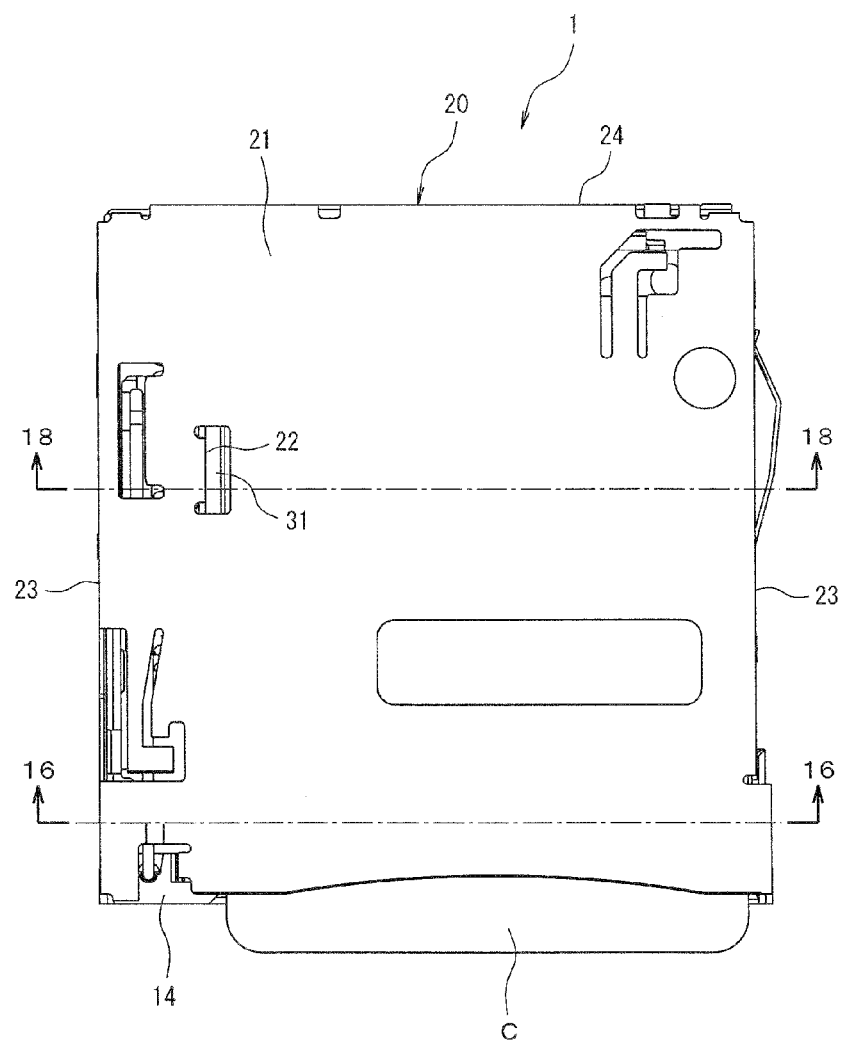
FIG. 14 is a plan view of the card connector in FIG. 1 where the card insertion into the connector is completed.
Figure 15:
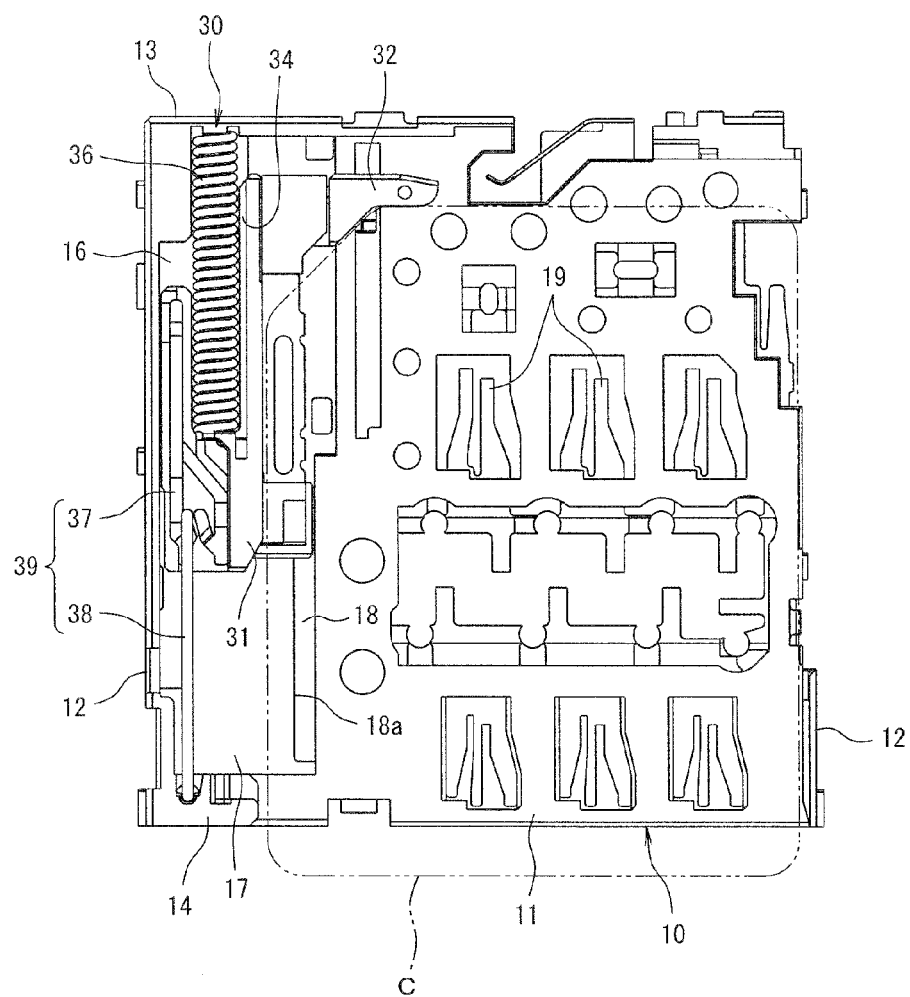
FIG. 15 is a plan view of the card connector in FIG. 14, where the shell is removed.
Figure 16:
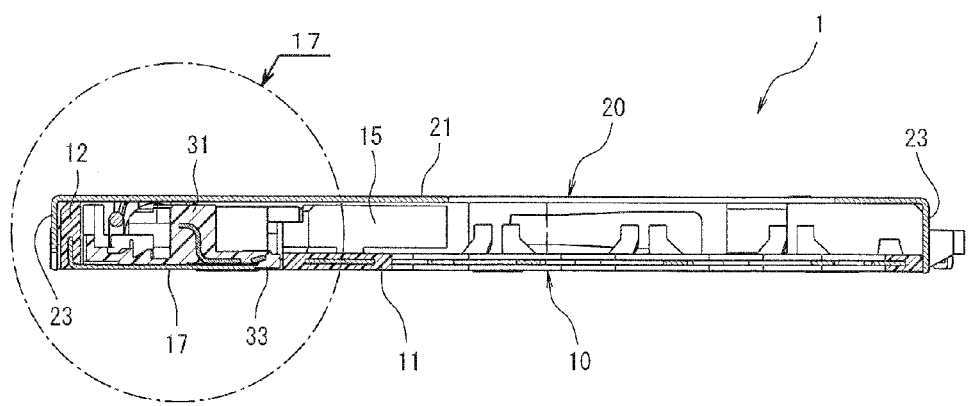
FIG. 16 is a cross-sectional view taken along a line 16-16 in FIG. 14.
Figure 17:
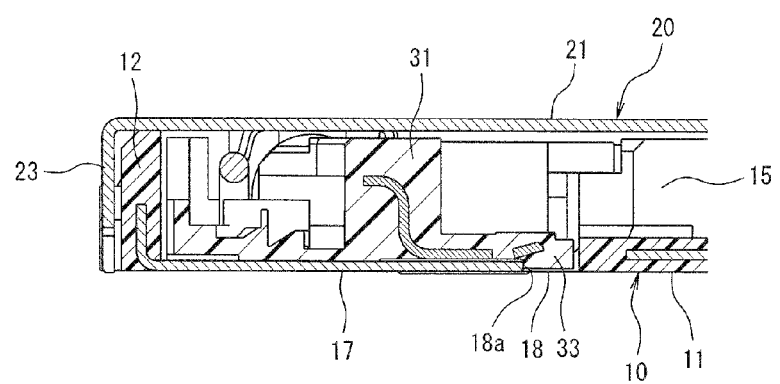
FIG. 17 is an enlarged view of area 17 in FIG. 16.
Figure 18:
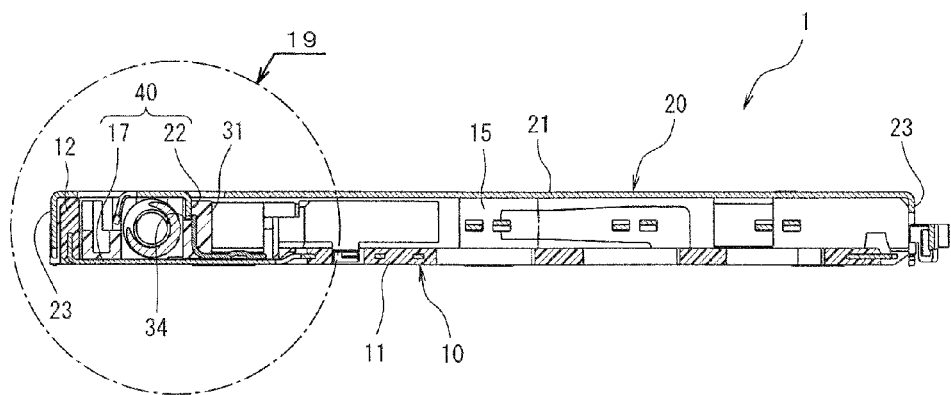
FIG. 18 is a cross-sectional view taken along a line 18-18 in FIG. 14.
Figure 19:
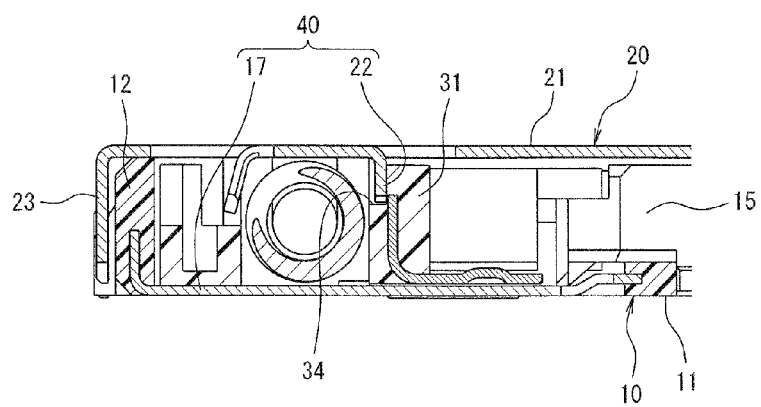
FIG. 19 is an enlarged view of area 19 in FIG. 18.

The card ejection mechanism 30 is disposed in the card ejection mechanism receiving Space 16 formed on the base 11 of the housing 10 to eject the card C that is inserted in the card insertion space 15. This card ejection mechanism 30 is a push-push type of ejection mechanism, and includes a sliding member 31 sliding in the card-inserting direction (direction from the card insertion end to the distal end) and in the card-ejecting direction (direction from the distal end to the card insertion end). Furthermore, the card ejection mechanism 30 includes: a spring 36 for pushing the sliding member 31 in the card-ejecting direction; and a lock 39 for locking the sliding member 31 at a locking position in the card-inserting direction and in the card-ejecting direction against the biasing force of the spring 36.

a. The sliding member 31 is formed by molding synthetic resin, and slides together with the card C in the card ejection mechanism receiving space 16 in the card-inserting direction and in the card-ejecting direction. As illustrated in FIG. 3, a card contact 32 is positioned on a distal end of the sliding member and projects inward, perpendicular to the card insertion direction. A first spring guide pin 35 positioned on a card insertion end of the sliding member 31.

b. The spring 36 includes a compression coil spring supported by a second spring guide pin 28 positioned on the distal wall 13 of the housing 10 and the first spring guide pin 35 positioned on the card insertion end of the sliding member 31. The spring 36 biases the sliding member 31 by producing a load on the sliding member 31 in the card-ejecting direction.

c. As illustrated in FIG. 3, the lock 39 includes: a cam groove 37 formed in an interior facing surface of the sliding member 31; and a cam pin 38 which has a pivot end pivotally mounted on the interior facing surface of the card insertion end wall 14 and a groove engaging end engaged with the cam groove 37. The lock 39 locks the sliding member 31 at a locking position in the card-inserting direction and in the card-ejecting direction against the biasing force of the spring 36. The locking position is illustrated in FIG. 15, and is a position whereby the sliding member 31 has been displaced along the card insertion direction by an inserted card C.

d. FIGS. 6, 7, 12, 13, 18, and 19 further disclose the card ejection mechanism 30 having a sliding member guide 40 for guiding the sliding member 31 as it is displaced along the card insertion direction by the inserted card C.

e. The sliding member guide 40 includes: a first guiding member 17 positioned at the card insertion end on the interior surface of the base 11, for guiding the card insertion end of the sliding member 31; and a second guiding member 22, positioned at the distal end on an interior surface of the shell 20, for guiding the distal end of the sliding member 31.

f. As illustrated in FIGS. 4, 5, 10, 11, 16, and 17, the first guiding member 17 is made of a metal sheet formed by insert molding in the base 11, and a first notch 18 that extends along the card insertion axis and is formed at the card insertion end of the first guiding member 17.

g. FIGS. 4, 5, 10, 11, 16, and 17 disclose a protrusion 33 protruding outward from an outer surface of the card insertion end of the sliding member 31. The protrusion 33 is positioned into the first notch 18, and an outer surface of the protrusion 33 is guided along an edge 18a of the first notch 18.

h. Furthermore, as illustrated in FIGS. 2, 6, 7, 8, 12, 13, 14, 18, and 19, the second guiding member 22 is formed by being bent inward from the planar member 21 of the shell 20. A second notch 34 that extends from the card insertion end to the distal end is formed in the interior surface of the sliding member 31. As illustrated in FIG. 6 and FIG. 7, the second guiding member 22 fits into the second notch 34 and a side wall of the second notch 34 is guided along the second guiding member 22.

i. Next, an operation of the card ejection mechanism 30 will be described with reference to FIGS. 2-19.

j. First, when the card C is not inserted in the card connector 1, the sliding member 31 is located at the card ejection position illustrated in FIGS. 2-7. The sliding member 31 is biased by the spring 36 in the card-ejecting direction and abuts against the card insertion end wall 14 of the housing 10. The groove engaging end of the cam pin 38 is located at a distal end of the cam groove 37 when the card is not inserted in the card connector 1.

k. As illustrated in FIGS. 4 and 5, the protrusion 33 of the sliding member 31 fits into the first notch 18 of the first guiding member 17, and an outer surface of the protrusion 33 is in contact with the edge 18a of the first notch 18. In addition, as illustrated in FIGS. 6 and 7, the second guiding member 22 fits into the second notch 34 of the sliding member 31, and a side face of the second notch 34 is in contact with the second guiding member 22.

l. As shown in FIGS. 8 and 9, when the card C is inserted into the card insertion space 15 in the card-inserting direction towards the distal end of the housing 10, the leading end of the card C abuts against the card contact 32 of the sliding member 31, and the sliding member 31 is displaced together with the card C in the card-inserting direction. When the card C has been inserted, the sliding member 31 abuts against the distal wall 13 of the housing 10, and reaches the card insertion position illustrated in FIGS. 8-13. The groove engaging end of the cam pin 38 is located at a card insertion end of the cam groove 37 when the card C is inserted into the card connector 1.

m. As illustrated in FIGS. 10 and 11, the outer surface of the protrusion 33 of the sliding member 31 is guided along the edge 18a of the first notch 18. In addition, as illustrated in FIGS. 12 and 13, the side face of the second notch 34 of the sliding member 31 is guided along the second guiding member 22.

n. Upon complete insertion of the card C, the sliding member 31 is located at the card insertion position illustrated in FIGS. 8-13. Since the sliding member 31 is biased in the card-ejecting direction by the biasing force of the spring 36, the card C settles into the card operating position illustrated in FIGS. 14-19. At this time, the groove engaging end of the cam pin 38 is located at a locking position of the cam groove 37, locking the sliding member 31 at the locking position.

o. In FIGS. 16-17, the outer surface of the protrusion 33 of the sliding member 31 is guided along the edge 18a of the first notch 18. In addition, as illustrated in FIGS. 18-19, the side face of the second notch 34 of the sliding member 31 is guided along the second guiding member 22.

When the sliding member 31 is located at the card operating position illustrated in FIGS. 14-19, conductive pads formed on the exterior of the card C make contact with the electrical contacts 19, to form an electrical connection between the card C and the circuit board.

To eject the inserted card C, the card C is pushed in the card-inserting direction. (FIGS. 14-19) The groove engaging end of the cam pin 38 is then released from the locking position of the cam groove 37, and the sliding member 31 abuts against the distal wall 13 of the housing 10 to reach the card insertion position illustrated in FIGS. 8-13.

In FIGS. 10-11, the outer surface of the protrusion 33 of the sliding member 31 is guided along the edge 18a of the first notch 18. Moreover, as illustrated in FIGS. 12-13, the side face of the second notch 34 of the sliding member 31 is guided along the second guiding member 22.

Since the sliding member 31 is biased in the card-ejecting direction by the biasing force of the spring 36, the sliding member 31 is displaced along the card ejection direction until it and reaches the card ejection position illustrated in FIGS. 2-7. Thus, the card C is ejected from the card insertion space 15.

As illustrated in FIGS. 4 and 5, the outer surface of the protrusion 33 of the sliding member 31 is guided along the edge 18a of the first notch 18, and as illustrated in FIG. 6 and FIG. 7, the side face of the second notch 34 of the sliding member 31 is guided along the second guiding member 22.

Figure 20A:
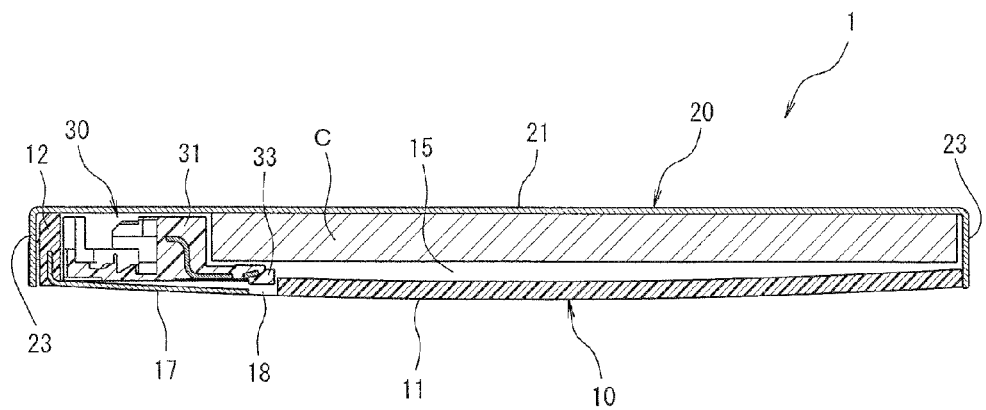
Figure 20B:
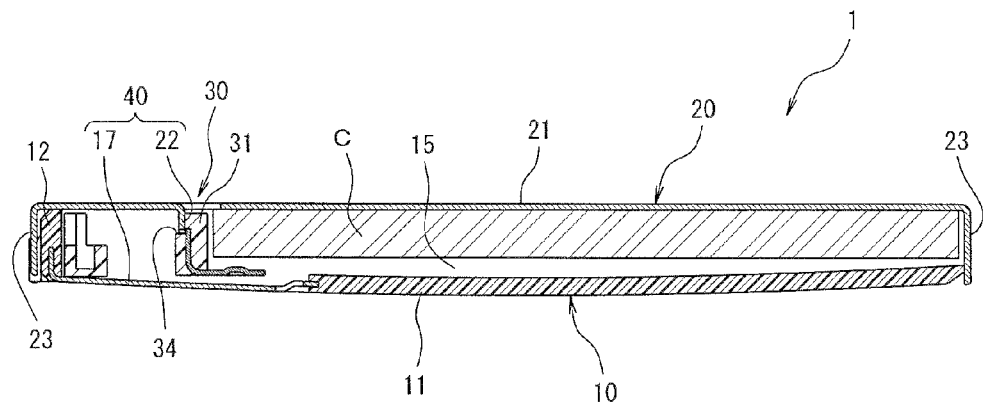

The operation of the card ejection mechanism 30 has been described. However, the card connector 101 may be mounted on a flexible board such as a flexible printed circuit (FPC). In these cases, as illustrated in FIGS. 20A and 20B, when the card C is located in the card insertion space 15, the base 11 of the housing 10 may be warped by an elastic force of the electrical contacts 19.

In such a case, the first guiding member 17 provided at the base 11 of the housing 10 may be displaced outward, and the protrusion 33 of the sliding member 31 may be disengaged from the first notch 18 of the first guiding member 17. (FIG. 20A) However, the second guiding member 22 provided on the shell 20 guides the second notch 34 of the sliding member 31. (FIG. 20B) The guiding mechanism of the second guiding member 22 is ensured in any stage while the sliding member 31 is moving from the card ejection position, to the card insertion position, to the card operating position, to the card insertion position, and to the card ejection position. Therefore, even if the base 11 of the housing 10 is warped, it is possible to guide the sliding of the sliding member 31 in an appropriate manner.

Figure 21A:
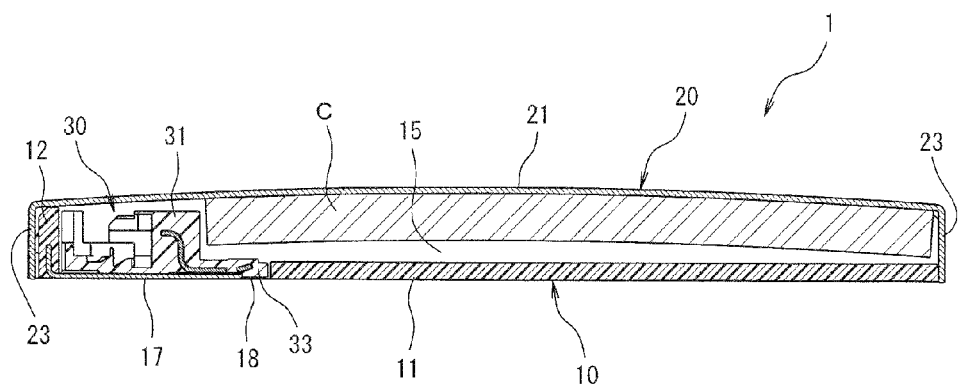
Figure 21B:
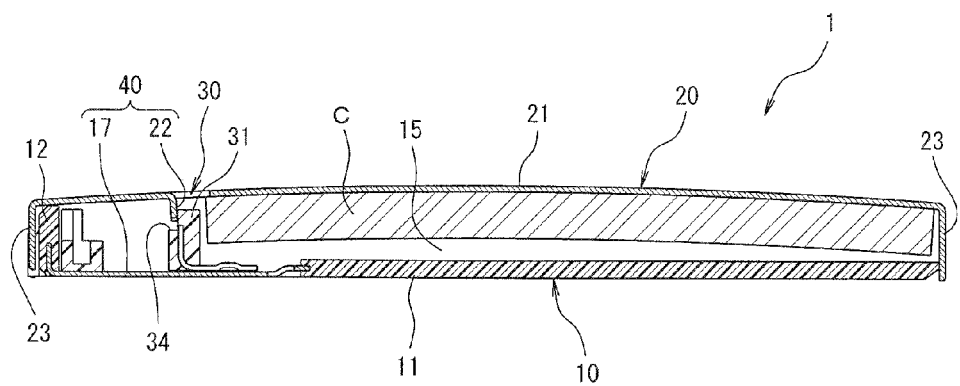

Conversely, as illustrated in FIGS. 21A and 21B, depending on the configuration how the card connector 1 is mounted, the shell 20 attached to the upper portion of the housing 10 may be warped. In this case, the second guiding member 22 provided on the shell 20 is displaced upward. (FIG. 21A) If the second guiding member 22 is displaced upward, the second guiding member 22 may be released from the second notch 34 of the sliding member 31. However, the first notch 18 of the first guiding member 17 provided on the base 11 of the housing 10 is still able to guide the protrusion 33 of the sliding member 31. (FIG. 21A) The guiding mechanism of the first guiding member 17 is ensured in any stage while the sliding member 31 is moving from the card ejection position, to the card insertion position, to the card operating position, to the card insertion position, and to the card ejection position. Thus, even if the shell 20 attached to the upper side of the housing 10 is warped, it is possible to guide the sliding of the sliding member 31 in an appropriate manner.

Moreover, according to the card connector 1, the sliding member 31 is made of resin, whereas the first guiding member 17 and the second guiding member 22 are made of metal. Therefore, friction is minimized between the sliding member 31, and the first guiding member 17 and the second guiding member 22, so the sliding resistance of the sliding member 31 is reduced. It is therefore possible to insert and eject the card C in a smooth manner.

Figure 22:
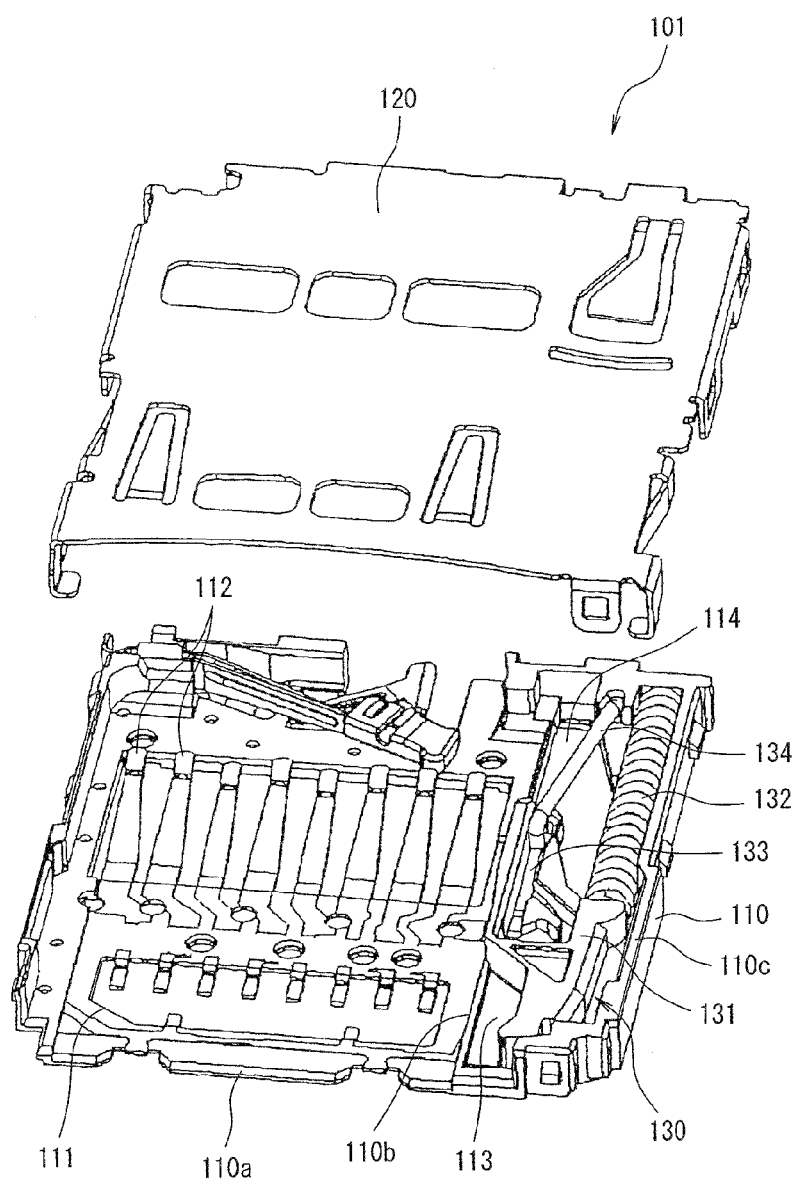
FIG. 22 is an exploded perspective view of a conventional card connector.

According to the conventional card connector 101 illustrated in FIG. 22, the sliding member 131 is made of resin and slides in the card ejection mechanism receiving space 113 together with the card in the card-inserting direction and in the card-ejecting direction. When the sliding member 131 slides, the friction is little because the sliding member 131 slides over the metal sheet 114, whereas one of the side walls of the sliding member 131 slides along the guide wall 110b made of resin. In the case where the sliding member 131 made of resin slides along the guide wall 110b made of resin for the card insertion and ejection operations repeatedly, frictional wearing may be caused between the sliding member 131 and the guide wall 110b. The frictional wearing caused by the sliding member 131 and the guide wall 110b increases the sliding resistance. Accordingly, the card cannot be inserted or ejected in a smooth manner.

In contrast, according to the card connector 1 of the present embodiment, as described above, the sliding member 31 is made of resin, and the first guiding member 17 and the second guiding member 22 are made of metal. Hence, the frictional wear is greatly reduced.

Moreover, according to the card connector 1 of the present embodiment, the shell 20 is made of metal, the housing 10 is made of resin, and the first guiding member 17 is made of a metal sheet formed by insert molding in the base 11 of the housing 10. In addition, the second guiding member 22 is formed by being bent inward from the metal shell 20. Accordingly, the metal first guiding member 17 and the metal second guiding member 22 reduce the number of separate parts in the card connector 1. Further, manufacturing of the card connector is simplified.

Although the embodiment of the present invention has been described, the invention is not limited to the embodiment, and various modifications and improvements are applicable.

For example, the first guiding member 17 may take any form as far as it guides the lower portion of the sliding member 31. The first guiding member 17 does not necessarily have the first notch 18 to guide the protrusion 33.

Moreover, the first guiding member 17 can positioned on the base 11 of the housing 10 or on a different component of the card connector 1. Additionally, the first guiding member can be made of other suitable materials besides metal.

Furthermore, the first guiding member 17 can be made by alternative processes than a metal sheet formed by insert molding in the base 11.

One of ordinary skill in the art would appreciate that the second guiding member 22 may take any form as far as it guides the upper portion of the sliding member 31. The second guiding member 22 can position the second notch 34 at only positions along the interior surface and is not limited to extending to the back end portion from the card insertion end on the interior of the sliding member 31.

Still further, the second guiding member 22 is can be provided on alternative positions than on the shell 20 and can be made of other suitable materials besides metal.

What is claimed is:

1. A card connector comprising:
   a housing having a card insertion end, an opposing distal end, and a base;
   a shell positioned on the housing;
   a card insertion space positioned between the housing and the shell;
   a card ejection mechanism receiving space positioned between the housing and the shell; and
   a card ejection mechanism disposed in the card ejection mechanism receiving space having:
   a sliding member;
   a spring biasing the sliding member in a card-ejecting direction;
   a lock for locking the sliding member; and
   a sliding member guide having:
   a first guiding member disposed on an interior surface of the base and engageable with a card insertion end of the sliding member; and
   a second guiding member disposed on an interior surface of the shell and engageable with a distal end of the sliding member.

2. The card connector according to claim 1, wherein the sliding member is made of resin.

3. The card connector according to claim 1, wherein the first guiding member is made of metal.

4. The card connector according to claim 1, wherein the second guiding member is made of metal.

5. The card connector according to claim 1, wherein the shell is made of metal.

6. The card connector according to claim 1, wherein the housing is made of resin.

7. The card connector according to claim 3, wherein the first guiding member is a metal sheet insert molded in the base of the housing.

8. The card connector according to claim 4, wherein the second guiding member is bent inward from the shell.

9. The card connector according to claim 1, wherein the first guiding member is engageable with the card insertion end of the sliding member when the shell is displaced outward.

10. The card connector according to claim 1, wherein the second guiding member is engageable with the distal end of the sliding member when the base is displaced outward.

11. The card connector according to claim 1, wherein the first guiding member includes a first notch disposed at a card insertion end thereof.

12. The card connector according to claim 11, wherein the sliding member includes a second notch extending into an interior surface thereof.

13. The card connector according to claim 12, wherein the second notch extends from a card insertion end to the distal end.

14. The card connector according to claim 12, wherein the sliding member further includes a protrusion protruding outward from an outer surface of the card insertion end.

15. The card connector according to claim 14, wherein the first notch guides the protrusion.

16. The card connector according to claim 15, wherein the second guiding member guides the second notch.

* * * * *